Oct. 13, 1970  C. L. TILLMAN III  3,533,598
GATE VALVE
Filed Oct. 28, 1968

INVENTOR
CASSIUS L. TILLMAN III

BY *Albert J. Kramer*
ATTORNEY

United States Patent Office 3,533,598
Patented Oct. 13, 1970

3,533,598
GATE VALVE
Cassius L. Tillman, P.O. Box 343, Peters Road,
Harvey, La. 70058
Continuation-in-part of application Ser. No. 617,899,
Feb. 23, 1967. This application Oct. 28, 1968, Ser.
No. 771,120
Int. Cl. F16k 3/314
U.S. Cl. 251—327      10 Claims

ABSTRACT OF THE DISCLOSURE

A gate type valve has shiftable seals under pressure in recesses of the ports against either side of the gate. The gate is loosely pin-connected to a drive shaft at the top and to a guide shaft at the bottom to provide for lateral movement of the gate relative to the ports, all of which tends to equalize pressures between the seals and gate. Diameter interference between the seals and recesses permits a degree of deflection under stress within the elastic limit of the seals and valve body which provides a constant sealing pressure. Abutments between the seals and recesses limit the stress to a degree within such elastic limit.

---

This is a continuation-in-part of my co-pending application, Ser. No. 617,899, filed Feb. 23, 1967, and now abandoned.

This invention relates to valves and it is more particularly concerned with a valve of the sliding gate type.

An object of the invention is the provision of a gate valve in which the gate is under constant sealing pressure in both the open and closed positions.

Another object is the provision of a sliding gate in which the sealing pressure on the gate is substantially equally distributed throughout the areas of contact with the gate.

A still further object is the provision of floating seals and an attitude adjustable gate whereby equalization of pressure between the seals and gate is automatically effected.

These and still further objects, features and advantages of the invention will be apparent from the following description considered together with the accompanying drawing.

Figure 2:
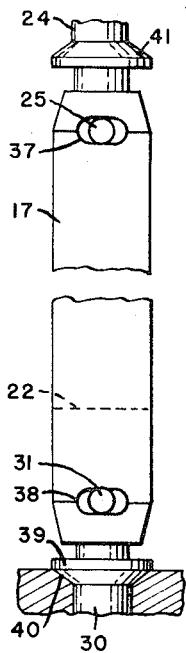
FIG. 2 is a fragmentary view of the valve gate and connecting shafts partly broken away, in elevation, showing a modified embodiment.
Figure 1:
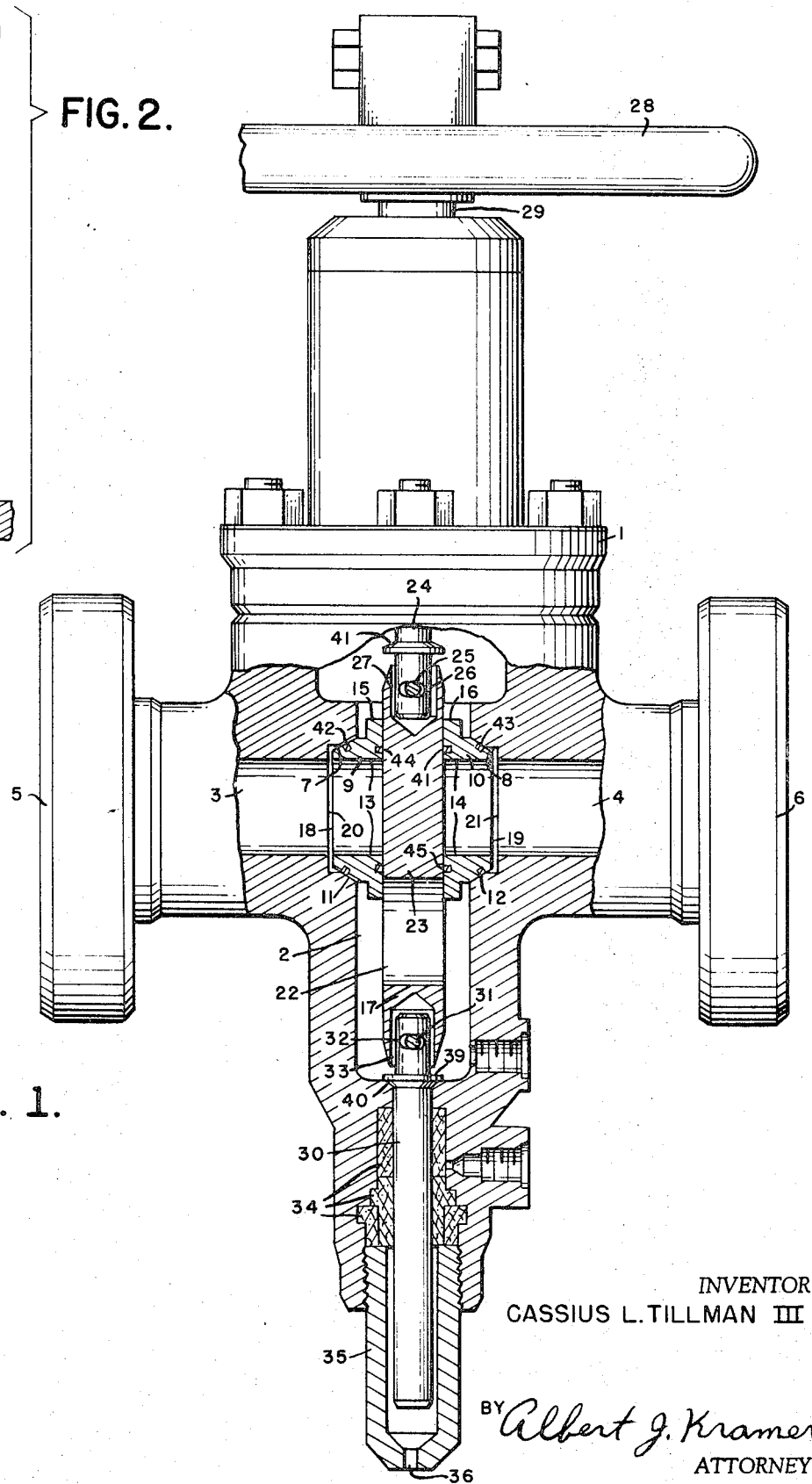
FIG. 1 is a side elevational view of an embodiment of the invention partly in longitudinal section.

Referring to the drawing with more particularity the embodiment illustrated comprises a valve body 1 having a central cavity 2 including side ports 3 and 4 on either side through which fluid is adapted to flow when the valve is open.

The valve body comprises the conventional heavy flanges 5 and 6 at the outer ends of the ports 3 and 4 for attachment in the conventional manner to a pipe system (not shown).

At the inner ends of the ports 3 and 4 there are provided recesses 7 and 8 for the reception of metallic pressure seals 9 and 10, respectively. These pressure seals have tapered outer surfaces 11 and 12, openings 13 and 14 of a diameter equal to the ports 3 and 4, and flanges 15 and 16 at their inner ends.

The recesses 7 and 8 are provided with frusto-conical abutment surfaces corresponding to the tapered surfaces 11 and 12, but of slightly different slopes to provide diameter interference therebetween so that a degree of deflection may be created in the seals under the stress of forces acting outwardly against the seals.

A gate 17 is slidably disposed between the flanges 15 and 16 of the seals 9 and 10 under a pressure within the elastic limit of the seals and valve body. Hence, deflection of the seals outwardly in contact with the frusto-conical abutment surfaces of the recesses 7 and 8 results in a constant pressure inwardly by the seals against the sides of the gate 17. This deflection is limited by abutment between the outer ends 18 and 19 of the seals and the outer ends 20 and 21 of the recesses.

The gate 17 is provided with a lateral opening 22 at the bottom and an imperforate section 23 at the top. When the opening 22 is in registry with the openings 13 and 14 of the seals, the valve is open. When the imperforate section 23 is in contact with the openings 13 and 14, the valve is closed.

The upper end of the gate 17 is connected to a drive shaft 24 by means of a pin 25. The opening 26 in the drive shaft is horizontally elongated. The lower end of the shaft 24 loosely fits in a socket 27 of the gate. By these means there is provided a degree of relative movement laterally between the gate and shaft 24. The shaft 24 is otherwise of conventional design and extends upwardly through the valve body in conventional bearings and is provided with conventional means for raising and lowering it, including a hand wheel 28 connected to an internally threaded socket 29 which engages a threaded portion of the shaft (not shown).

The bottom of the gate 17 is likewise connected to a guide shaft 30 by means of a pin 31 and an opening 32, similar to the opening 26 in the shaft 30. The upper end of the shaft 30 loosely fits in a socket 33 of the gate. The shaft 30 extends downwardly into the housing which is provided with a packing gland 34 for the shaft 30 and a removable threaded extension 35. At the bottom of the extension 35 is a small opening 36 for checking valve leakage.

Alternatively, the openings 37 and 38 in the gate for the pins 25 and 31, respectively, may be horizontally elongated as shown in FIG. 2.

By these means there is provided a degree of relative movement between the guide shaft 30, the drive shaft 24 and gate 17, thereby assuring uniform pressures between the seals and gate, and obviating high and low pressure points which can be detrimental to a valve structure.

In the lowermost position of the gate 17 an annular stop flange 39 is adapted to register with a seat 40 in the valve body, thereby limiting the lowermost portion of the gate. A similar stop flange 41 is provided on the drive shaft 24 to engage a similar seat (not shown) when the gate is in its uppermost position.

Surface seals 42, 43 of rubber, nylon, Hycar, neoprene, or other suitable material are provided in annular grooves of the tapered surfaces 11, 12 respectively. Similar surface seals 44, 45 are provided in circular grooves at the inner ends of the metallic seals 9, 10 respectively.

In the description above, it is to be understood that "longitudinally" refers to the vertical aspect of the valve as shown in the drawing; "laterally" refers to the horizontal aspect of the valve; "outwardly" refers to directions away from the center of the valve; "inward" refers to directions toward the center of the valve.

I claim:

1. A gate valve comprising a valve body having a cavity therein, including aligned ports, a gate between said ports, said gate being movable between an open position and a closed position, shiftable seal means between said gate and each port, said means comprising a tapered member on either side of the gate, said valve body having frusto-conical recesses adjacent the inner ends of the ports for shiftably sealing said tapered members, the taper of each tapered member being on an incline slightly different from the incline of its corresponding frusto-conical recess, both tapered members being constantly stressed against their corresponding frusto-conical recesses by the gate in an amount within the elastic limit of the seals and the gate body, means for moving said gate between its open and closed positions and supporting said gate in its open and closed positions to provide co-movement of the gate laterally with said shiftable means.

2. A gate valve as defined by claim 1 and abutment means between the seals and recesses for limiting the stress of the tapered member to an amount within the elastic limit of the seals and valve body.

3. A gate valve as defined by claim 1 in which the supporting means comprises a drive shaft pivotally connected to the gate.

4. A gate valve as defined by claim 1 in which the supporting means comprises a drive shaft pivotally connected to one end of the gate and a guide shaft pivotally connected to the other end of the gate.

5. A gate valve as defined by claim 4 in which the guide shaft is slidably mounted in the valve body.

6. A gate valve as defined by claim 5 and a packing gland between the valve body and guide shaft.

7. A gate valve as defined by claim 1 in which the gate is connected to upper and lower shafts by means of pins passing through enlarged openings.

8. A gate valve as defined by claim 7 in which the openings are horizontally elongated greater than the diameter of the pins.

9. A gate valve as defined by claim 7 in which the enlarged openings are in the gate.

10. A gate valve as defined by claim 7 in which the enlarged openings are in the shafts.

References Cited

UNITED STATES PATENTS

| | | | |
|---|---|---|---|
| 2,868,495 | 1/1959 | Lucas | 251—327 X |
| 3,026,084 | 3/1962 | Bryant | 251—327 X |
| 3,188,049 | 6/1965 | Zawacki et al. | 251—327 |
| 3,223,380 | 12/1965 | Hochmuth et al. | 251—327 X |
| 3,307,826 | 3/1967 | Lowrey | 251—175 X |
| 3,348,567 | 10/1967 | Volpin | 251—327 X |

ARNOLD ROSENTHAL, Primary Examiner

U.S. Cl. X.R.

251—328